May 16, 1939.   J. A. RAMSEY   2,158,591
PISTON VALVE
Filed May 3, 1937
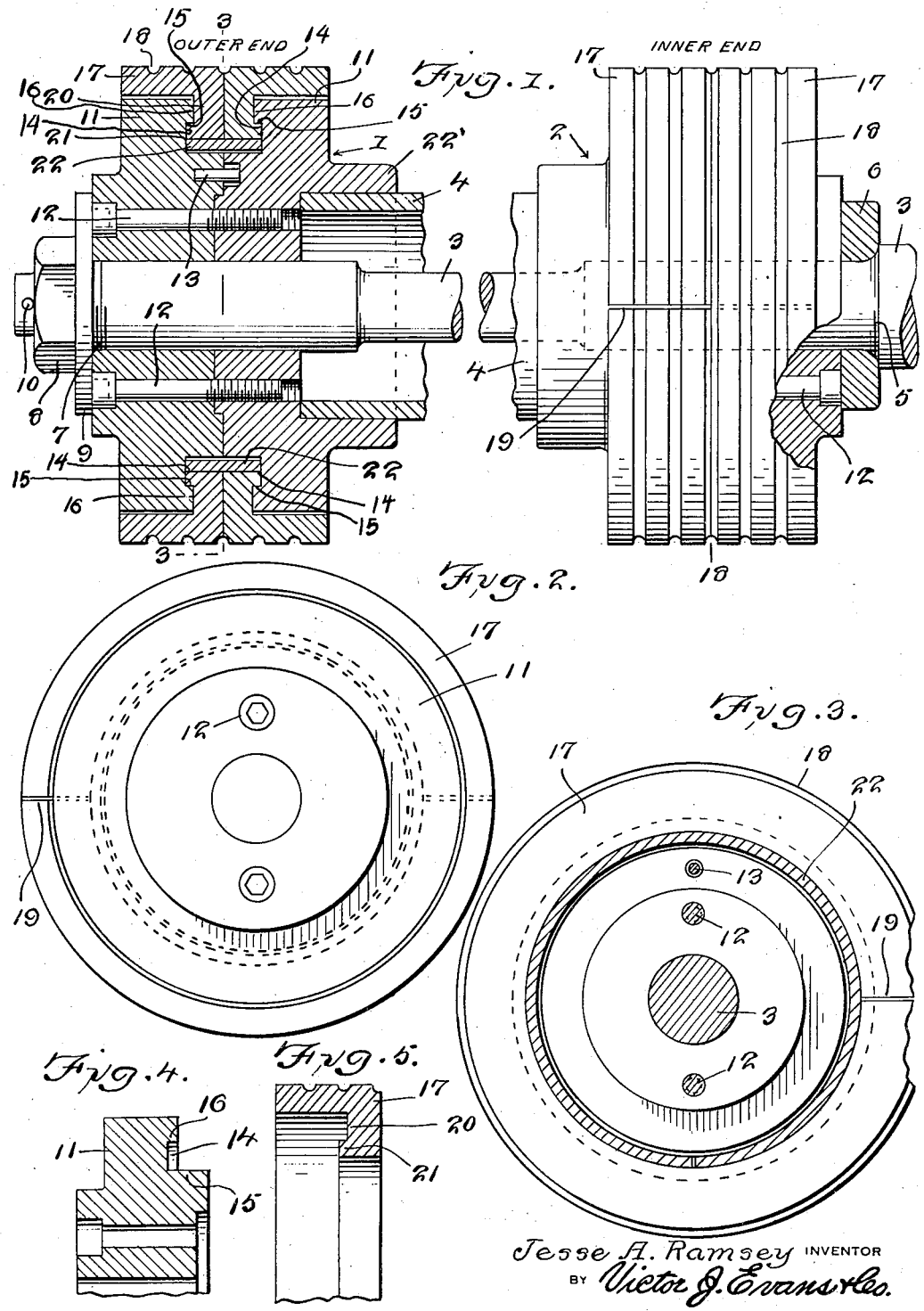

Patented May 16, 1939

2,158,591

UNITED STATES PATENT OFFICE 2,158,591

PISTON VALVE

Jesse A. Ramsey, Wenonah, N. J.

Application May 3, 1937, Serial No. 140,541

1 Claim. (Cl. 309—7)

This invention relates to piston type valves adaptable for steam engines, pumps and similar devices wherein it is desired to maintain a sliding fit with walls of a cylinder without allowing excessive leakage either of liquid, steam or gas, and has for the primary object the provision of a device of this character which may be readily and economically manufactured and assembled and will provide maximum contact with the walls of the cylinder without excessive pressure thereon and to bring about undue wear either on the rings or the wall of the cylinder and also eliminates irregular wearing which would cause shoulder formations in the cylinder or on the piston valve.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation, partly in section, showing a piston type valve constructed in accordance with my invention.

Figure 2 is an end view showing the same.

Figure 3 is a sectional view taken on the line 3—3 of Figure 1.

Figure 4 is a fragmentary sectional view showing one of the body elements of the valve.

Figure 5 is a fragmentary sectional view illustrating one of the rings.

Referring in detail to the drawing, the piston valve is composed of piston heads 1 and 2 removably mounted and arranged in spaced relation on a stem or shaft 3. The piston heads 1 and 2 are held separated by a sleeve 4. A shoulder or stop 5 is formed on the stem 3 to form a seat for a washer-like element 6 engageable with the piston head 2. The stem is also screw threaded, as shown at 7, to receive a nut 8 and interposed between the nut 8 and the piston head 1 is a washer or stop 9. The stem 3 has an opening 10 to receive a cotter key or similar device for preventing the nut 8 from unthreading from the stem. Thus it will be seen that the piston heads 1 and 2 may be readily assembled on the stem 3 and held in spaced relation by the sleeve 4.

The piston heads each include companion body sections 11 provided with bores to receive the stem 3. The body sections 11 are of annular formation and are detachably connected by stud bolts 12 threaded into the section 11 at the right in Figure 1. The stud bolts are overlaid by the washers and are prevented from unthreading from the body sections during the use of the device. The sections 11 are further held assembled by dowel pins 13, the latter being fixed to one section while operating in recesses of the companion section to provide a limited floating action between the sections. The opposing faces of the body sections are cut away to form chambers 14 having outer walls 15 and the latter define in the chamber and to each body section a shoulder 16. Surrounding the body sections are rings 17 of maximum width and provided on their outer faces with grooves 18. The rings are of the split type, as shown at 19, and the adjacent edges of the rings have formed thereon annular flanges 20 fitting in the chambers 14. Shoulders 21 are formed on the flanges 20 to abut the shoulders 16 for limiting the expansion of the ring on the body section and against the walls of a cylinder. A seal ring 22 is located in the chamber and overlaps the flanges 20 of the ring 17. The seal ring 22 prevents leakage between the rings 17 and the body sections 11 of the piston heads. One of the sections of the piston head is flanged, as shown at 22', to form a seat for the sleeve 4.

The flanges 20 of the rings besides limiting the expansion of the rings under pressure against the walls of the cylinder also will prevent the rings from becoming detached from the piston head in case of breaking. The combined widths of the piston ring of each piston head is equal to the combined peripheral widths of the body sections of the piston heads so as to provide maximum contact with the walls of the cylinder.

Having described the invention, I claim:

A piston type valve comprising a shaft including piston head stops spaced from each other and one thereof removable from said shaft, spaced annular shaped piston heads mounted on said shaft between said stops, washers on said shaft between said piston heads and the stops, annular flanges formed on opposed faces of the piston heads and spaced from said shaft and providing shoulder portions on said piston heads, a spacing sleeve surrounding the shaft with its ends extending into said flanges and bearing against the shouldered portions for coacting with the stops in preventing sliding movement of the piston heads endwise of the shaft, said piston heads each including companion annular sections having the peripheries thereof surrounded by sealing rings and shaped to receive and clamp therebetween ring flanges of the sealing rings, and fasteners detachably connecting said sections of each piston head and overlapped by said washers to prevent said fasteners from becoming detached from the piston heads.

JESSE A. RAMSEY.